United States Patent
Yoshida

[19]

[11] Patent Number: 5,884,241
[45] Date of Patent: Mar. 16, 1999

[54] LOAD MEASURING APPARATUS FOR VEHICLE

[75] Inventor: Hiroshi Yoshida, Tokyo, Japan

[73] Assignee: Mitsubishi Jidosha Kogyo Kabushiki Kaisha, Tokyo, Japan

[21] Appl. No.: 836,533

[22] PCT Filed: Aug. 21, 1996

[86] PCT No.: PCT/JP96/02331

§ 371 Date: Apr. 30, 1997

§ 102(e) Date: Apr. 30, 1997

[87] PCT Pub. No.: WO97/08521

PCT Pub. Date: Mar. 6, 1997

[30] Foreign Application Priority Data

Aug. 31, 1995 [JP] Japan .................................. 7-223010

[51] Int. Cl.$^6$ .................................................. G01G 19/12
[52] U.S. Cl. .......................................... 702/174; 177/136
[58] Field of Search .................. 73/862.68, 862.632, 73/862.629, 862.622, 862–623

[56] References Cited

U.S. PATENT DOCUMENTS

| | | | |
|---|---|---|---|
| 4,625,739 | 1/1987 | Foley et al. . | |
| 4,651,838 | 3/1987 | Hamilton et al. | 73/862.542 |
| 4,771,837 | 9/1988 | Appleton et al. | 177/139 |
| 4,839,835 | 6/1989 | Hagenbuch | 364/567 |
| 4,917,197 | 4/1990 | Waite, Jr. | 177/137 |
| 5,105,896 | 4/1992 | Kyrtsos | 177/139 |
| 5,167,385 | 12/1992 | Hafner | 73/862.68 |
| 5,182,712 | 1/1993 | Kyrtsos et al. | 364/427.07 |
| 5,327,791 | 7/1994 | Walker | 73/862.628 |
| 5,359,516 | 10/1994 | Anderson | 364/424.07 |
| 5,391,843 | 2/1995 | Sato et al. . | |
| 5,410,109 | 4/1995 | Tarter et al. | 177/136 |
| 5,478,974 | 12/1995 | O'Dea | 177/25.14 |
| 5,509,293 | 4/1996 | Karumanchi | 73/18 |
| 5,557,526 | 9/1996 | Anderson | 364/424.07 |

FOREIGN PATENT DOCUMENTS

| | | |
|---|---|---|
| 6-69759 U | 9/1994 | Japan . |
| 8901137A1 | 2/1989 | WIPO . |
| 9205409A1 | 4/1992 | WIPO . |

*Primary Examiner*—Ronald L. Biegel

[57] ABSTRACT

A load calculated at the time of completion of cargo loading is detected and held to prevent a calculation output from being changed even when an output of load detection means changes due to a temperature change, thereby preventing the calculation output from being changed as far as a load weight is not changed. Further, at the time of reloading, the held calculation value is corrected according to the calculation value corresponding to a difference between the output value of the load detection means immediately before the reloading and the output value thereafter of the load detection means, thereby calculating the load weight at reloading while eliminating effects of temperature changes.

12 Claims, 5 Drawing Sheets

LOAD MEASURING APPARATUS FOR VEHICLE

FIELD OF THE INVENTION

This invention relates to a load measuring apparatus for a vehicle, which is adapted to measure a load carried by the vehicle without being affected by temperature changes.

BACKGROUND ART

Heretofore, as a load measuring apparatus for detecting a load carried by a vehicle such as a truck, an apparatus equipped with a strain gauge or a magnetostriction sensor in a suspension system which deforms or warps in accordance with changes in the weight of load has been used. In the prior art load measuring apparatus, an output value of the strain gauge or magnetostriction sensor is detected, and the output value is converted into a display value indicative of the weight of load (e.g. Japanese Utility Model Laid-open Publication 06-69759).

In the prior art load measuring apparatus, when the temperature changes, the detection output of the strain gauge or magnetostriction sensor is offset depending on the characteristics of the strain gauge or magnetostriction sensor, and the weight of load was converted from the offset output value. Therefore, the display value of load weight was varied due to the change in temperature. In particular, when the vehicle is running under a high-load, low-speed condition, such as running on an ascending slope at full load, the suspension system tends to increase in temperature, resulting in substantial changes in the display value of the load weight.

Providing a separate temperature compensation sensor, which detects a temperature of an environment in which the load measuring sensor is disposed, attached to a structure of the vehicle where it is susceptible to the deformation and strain has also been considered. A difference between the output of the load measuring sensor and the output of the temperature compensation sensor was used to eliminate the influence of the temperature changes. However, the suspension system has no sufficient space for mounting the temperature compensation sensor, and use of such a sensor increases the number of sensors, making the apparatus more expensive.

In view of the above prior art problems, a primary object of the present invention is to provide a load measuring apparatus which does not change in load weight measurement output even when the temperature changes.

DISCLOSURE OF THE INVENTION

In accordance with the present invention, there is provided a load measuring apparatus for a vehicle comprising load detection means for generating an output according to a load weight of a work carried by the vehicle, control means for calculating and outputting the load weight of the work carried by the vehicle according to the output of the load detection means, and loading completion detection means for detecting completion of loading the work onto the vehicle, wherein the control means holds a calculated load weight value at the time when completion of the loading is detected by the loading completion detection means and continues to output the held calculated value.

Thus, the output can be prevented from being varied by influence of temperature changes or the like after loading completion.

The apparatus according to the present invention further comprises immediate before loading detection means for detecting a condition immediately before loading the work onto the vehicle, wherein when the condition immediately before loading condition after the loading completion is detected, the control means corrects the held calculation value according to a difference between the output of the load detection means at the time the immediate before loading condition is detected and the output thereafter of the load detection means to calculate the load weight.

Therefore, by utilizing a difference between the load detection means output immediately before loading and a load detection means output thereafter, changes in characteristics caused by a temperature change of the load detection means can be canceled to calculate changes in load weight, which is used to correct the held load weight calculation value, thereby improving the accuracy during reloading.

Further, the loading completion detection means is adapted to detect starting of the vehicle, and the immediate before loading detection means is adapted to detect a standstill condition of the vehicle. Still further, the immediate before loading detection means is adapted to detect that the vehicle is in the the standstill condition after a lapse of a predetermined time from stopping of the vehicle.

Yet further, the apparatus further comprises a manual reset switch, when operation of the reset switch is detected, the load weight calculation value is updated to zero and held at the value, and the held calculated value is corrected according to a difference between the output of the load detection means at the time the reset switch is operated and the output thereafter of the load detection means to calculate the load weight. Yet further, the loading completion detection means can be an ignition key switch, and at least one of the loading completion detection means and the immediate before loading detection means can be a manual switch.

BEST MODE FOR PRACTICING THE INVENTION

The present invention will become more fully understood from the detailed description given hereinbelow and the accompanying drawings which are given by way of illustration only.

Figure 1:
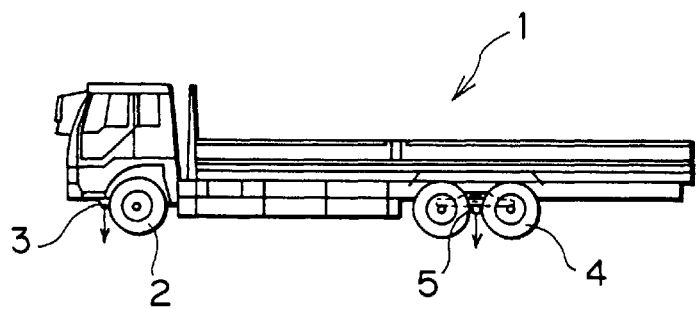
FIG. 1 is a schematic view showing a truck equipped with an embodiment of the load measuring apparatus according to the present invention.
Figure 2:
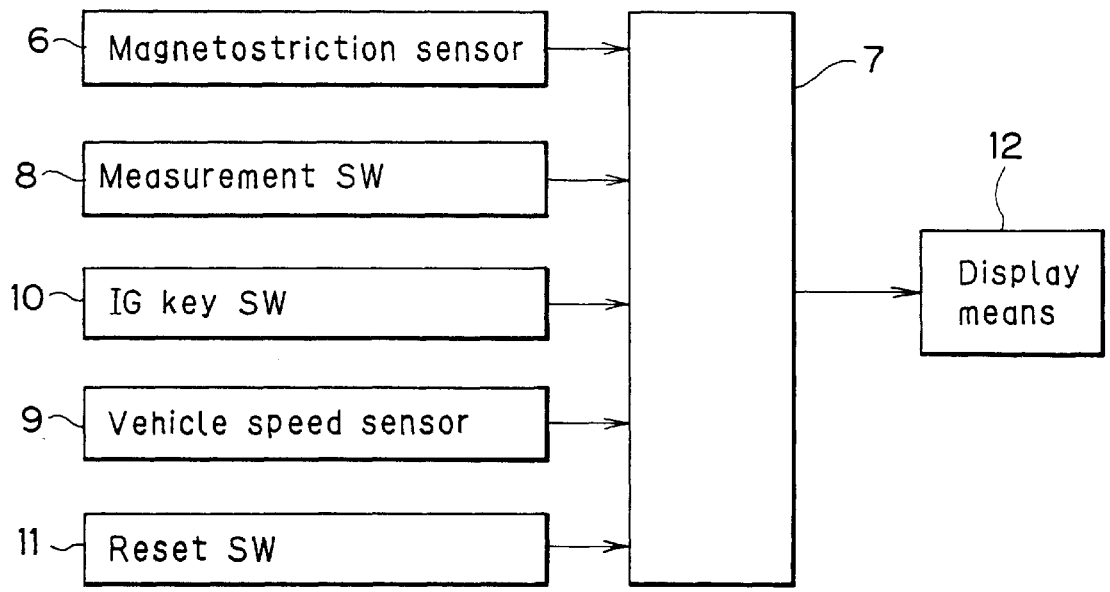
FIG. 2 is a block diagram showing the structure of the load measuring apparatus.

As shown in FIG. 1, a shackle pin 3 at a front wheel 2 side of a truck 1 and a trunnion shaft 5 at a rear wheel 4 side of the truck 1 are provided with magnetostriction sensors 6, as shown in FIG. 2, as detection means. Each sensor 6 is provided in each side of the truck 1. The shackle pin 3 and the trunnion shaft 5 deform or distort according to a change in load weight, and the magnetostriction sensor 6 outputs an electrical signal corresponding to the change in load applied to the above pin and shaft.

As shown in FIG. 2, the output signal of the magnetostriction sensor 6 is inputted to a control unit 7 as control means. The truck 1 is provided with a measurement switch 8, as a manual switch for loading completion means, for detecting completion of loading a cargo. Operation information of the measurement switch 8 is inputted to the control unit 7. Further, the truck 1 is provided with a vehicle speed sensor 9, as loading completion means, whereby completion of cargo loading is also determined when a running condition is detected by the vehicle speed sensor 9. A signal from the vehicle speed sensor 9 is inputted to the control unit 7.

Alternatively, information of an IG key switch 10 for detecting the condition of an ignition key (IG key) may be inputted to the control unit 7 to detect completion of cargo loading by the IG key switch 10. Further, immediate before loading detection means for detecting a condition immediately before loading by the measurement switch 8 and the vehicle speed sensor 9 are provided. Still further, the truck 1 is provided with a reset switch 11 which is manually operated, and operation information of the reset switch 11 is inputted to the control unit 7. The control unit 7 calculates the load weight according to the information from the above sensors and switches and the like and outputs a calculation result to display means 12.

Figure 3:
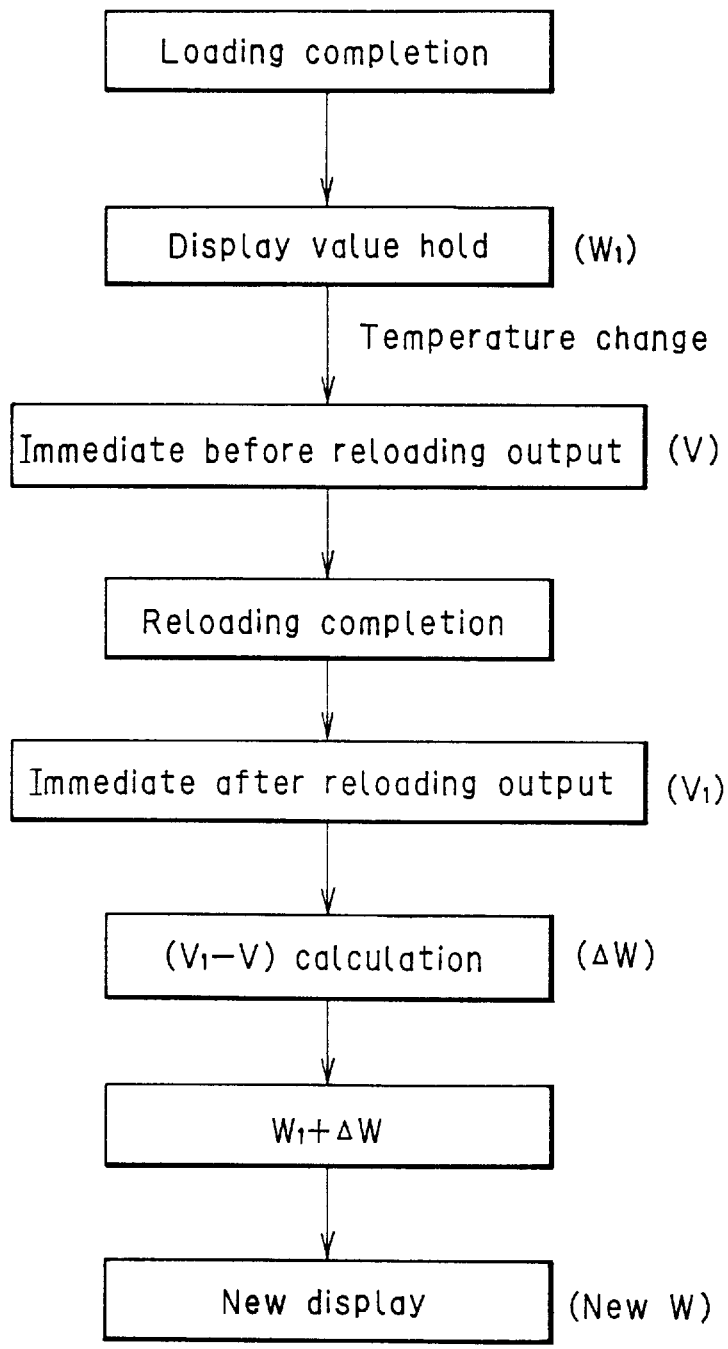
FIG. 3 is a diagram showing the entire control of the load measuring apparatus as shown in FIG. 2.

The entire functions of the load measuring apparatus will be described with reference to FIGS. 3 and 4.

When loading is completed, the display value of a load weight $W_1$, which is calculated according to the output value of the magnetostriction sensor 6 at that time, is held so that the display value of the load weight is not changed even if the output value of the magnetostriction sensor 6 changes due to a temperature change. When a cargo is loaded again, an output value V of the magnetostriction sensor 6 immediately before the reloading is read, and an output value $V_1$ of the magnetostriction sensor 6 at the time the reloading is completed is read. A load weight $\Delta W$ corresponding to $(V_1-V)$ is calculated according to the output values $V_1$, V, and the present load weight $\Delta W$ is added to the load weight $W_1$ held at the previous loading $(W_1+\Delta W)$, and the result is held as a new display value.

Figure 4:
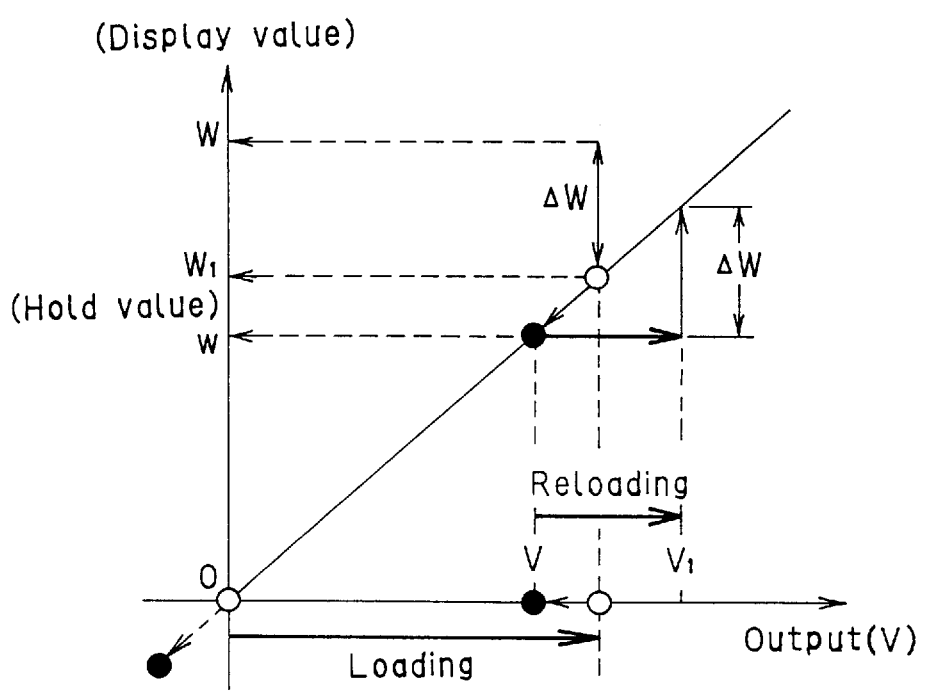
FIG. 4 is a graph showing a relationship between the sensor output and the display value of the condition of Fig. 3.

When, as shown in FIG. 4, the output value of the magnetostriction sensor 6 is changed from mark "○" to mark "●" due to a temperature change, in other words, when the load weight $W_1$ calculated according to the output value is changed to w, and the reloading is made without holding the display value of the load weight $W_1$ and the load weight $\Delta W$ corresponding to $(V_1-V)$ is calculated and added, the new load weight will be $(w+\Delta W)$ and a deviation occurs from the actual value $(W_1+\Delta W)$. With the load measuring apparatus according to the present invention, display value of the load weight is not changed even if the output value of the magnetostriction sensor 6 changes due to a temperature change, and at reloading, the value of the reloaded weight is added to the held load weight $W_1$ and the result is newly displayed. Thus, the correct load weight can be displayed.

An operation of the load measuring apparatus will be described in detail with reference to FIGS. 5 and 6.

Figure 5:
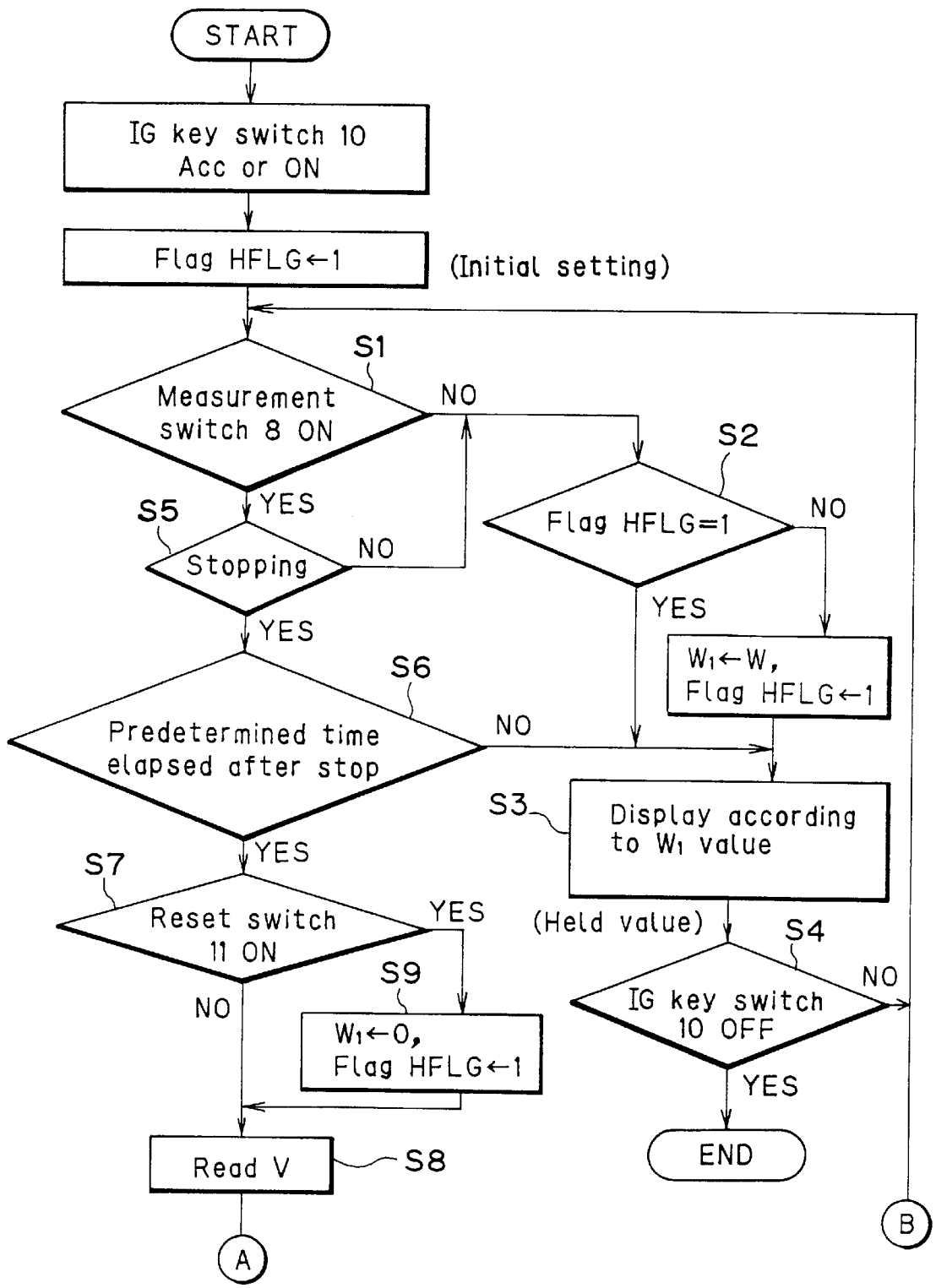
FIG. 5 is a flow chart showing an actual control condition by the load measuring apparatus.

As shown in FIG. 5, after the IG key switch 10 is in an Acc or ON position, a flag HFLG for holding the display value is set to an initial setting value of 1. A value 1 of the flag HFLG indicates holding, and 0 indicates unholding (under measurement). After the initial setting, a determination is made in step S1 as to whether or not the measurement switch 8 is ON. When the measurement switch 8 is not ON (measurement complete), the measurement switch 8 functions as loading completion detection means, and a determination is made in step S2 as to whether or not the flag HFLG is 1.

When the flag HFLG is determined to be 1, in step S3, the load weight $W_1$ (hold value) calculated according to the output value of the magnetostriction sensor 6 at that time is displayed. In step S2, when the flag HFLG is not 1, that is, when the flag HFLG is 0, the calculated load weight W (described later) is set as the load weight $W_1$ to be held, the flag HFLG is set to 1, and the processing proceeds to step 3. After that, a determination is made in step S4 as to whether or not the IG key switch 10 is in an OFF position. Until the IG key switch 10 is turned OFF, in other words, when the IG key switch 10 is in the Acc or ON position, the processing returns to step S1. That is, the processing of step S3, which is a function to hold the display value when loading, is completed.

Alternatively, instead of the determination in step S1, it is also possible to determine the completion of measurement according to the information from the switch of the load weight display means. In this case, completion of measurement is determined when the switch of the display means is not ON (same as when the measurement switch 8 is not ON), and since the switch of the display means is OFF, the processing in step S3 is omitted.

When, in step S1, it is determined that the measurement switch 8 is ON, the measurement switch 8 functions as immediate before loading detection means, and a determination is made in step S5 as to whether or not the vehicle is in a stop, that is, whether or not there is an output from the vehicle speed sensor 9. When, in step S5, the vehicle is determined to be running, the vehicle speed sensor 9 functions as loading completion detection means, and the processing proceeds to step S2. When, in step S5, the vehicle is determined to be in a stop, the vehicle speed sensor 9 functions as immediate before loading detection means, and a determination is made in step S6 as to whether or not a predetermined time has elapsed after a stop of the vehicle.

When it is determined in step S6 that the predetermined time has not yet elapsed after stopping of the vehicle, the processing proceeds to step S3. In the case where the measurement switch 8 is used without the vehicle speed sensor 9 as the loading completion detection means, the processing in steps S5 and S6 is omitted. In the case where the measurement switch 8 is not used and only the vehicle speed sensor 9 as the loading completion detection means is used, the processing in step S1 is omitted.

When it is determined in step S6 that the predetermined time has elapsed after stopping of the vehicle, a determination is made in step S7 as to whether or not the reset switch 11 is ON. When the reset switch 11 is not ON, in step S8, the output value V of the magnetostriction sensor 6 is read. When the reset switch 11 is ON, in step S9, the load weight $W_1$ to be held is set to zero and the flag HFLG is set to 1, and the processing proceeds to step S8. The processing in steps S7 and S9 is a function to reset the display value to zero when operation of the reset switch 11 is detected.

Figure 6:
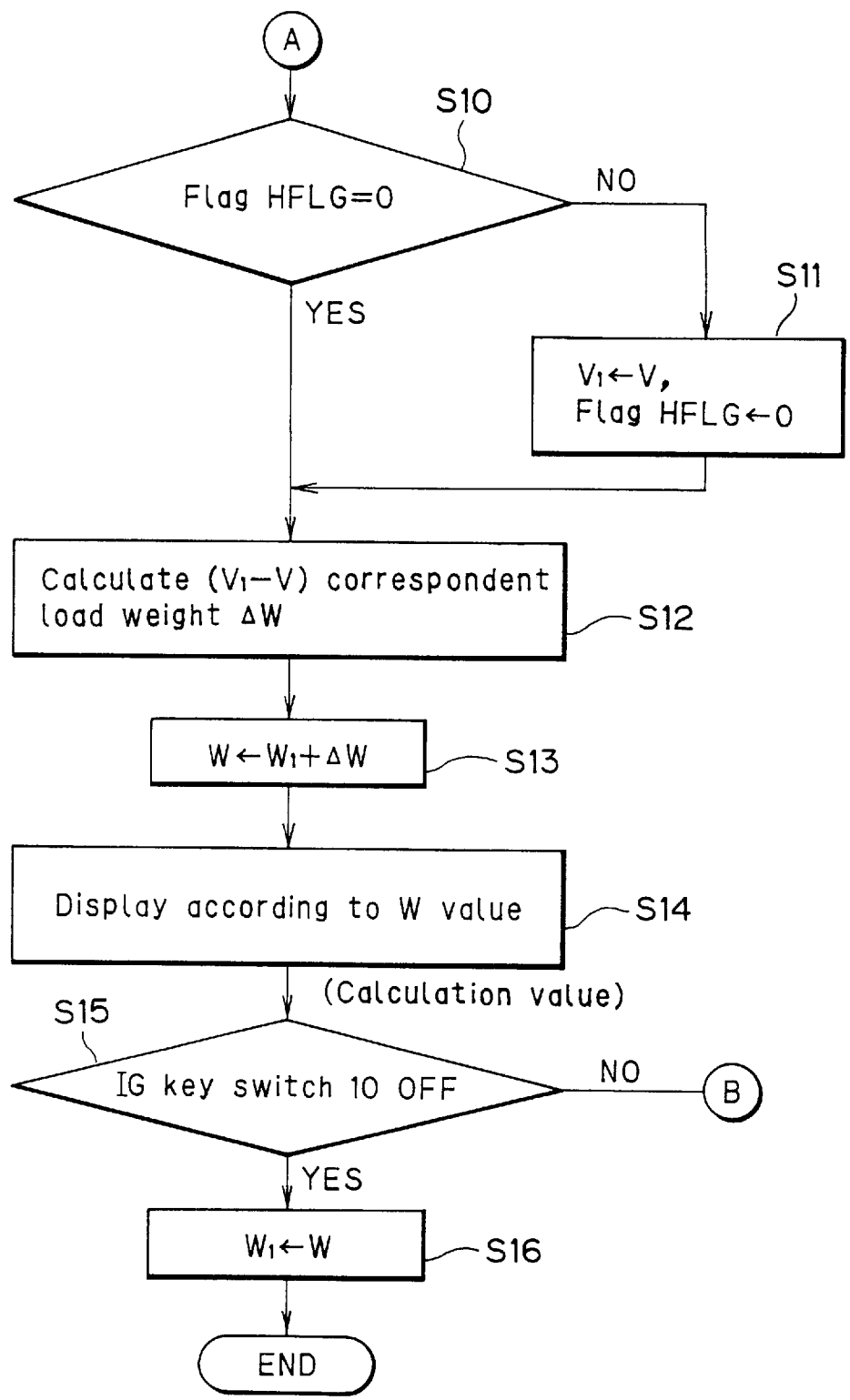
FIG. 6 is a flow chart showing an actual control condition by the load measuring apparatus.

After the output value V of the magnetostriction sensor 6 is read in step S8, as shown in FIG. 6, a determination is made in step S10 as to whether or not the flag HFLG is 0. When the flag HFLG is not 0, in step S11, the output value V of the magnetostriction sensor 6 is determined as an output value $V_1$ at the beginning of measurement and the flag HFLG is set to 0.

When in step S10 the flag HFLG is determined to be 0 or after the processing of step S11 is executed, in step S12, a load weight ΔW corresponding to the output value ($V_1$-V) of the magnetostriction sensor 6 is calculated. Then, in step S13, the load weight ΔW is added to the held load weight $W_1$ ($W_1$+ΔW) to obtain a new load weight W. In step S14, a display is made according to the calculated load weight W, and a determination is made in step S15 as to whether or not the IG key switch 10 is in the OFF position. When the IG key switch 10 is in either Acc or ON position, the processing returns to step S1 (FIG. 5). When the IG key switch 10 is determined to be in the OFF position, in step S16, the calculated load weight W is determined as the load weight $W_1$ to be held, and the processing is ended. That is, the processing of step S12 to step S14 is a function to correct the display value at reloading according to a difference between the output value V of the magnetostriction sensor 6 immediately before loading and the output value $V_1$ at the completion of loading.

As described above, since the display value according to the load weight calculated at the time the loading completion is detected is held and displayed, the display value is not varied as far as the load weight is not changed, and thus the driver will not be given apprehensions. Further, since the display value is corrected at reloading according to a difference between the output value V of the magnetostriction sensor 6 immediately before loading and the output value $V_1$ at the completion of loading, effects of temperature change can be eliminated to improve the accuracy of measurement at reloading.

Still further, since loading completion and immediate before loading are detected by operating the manual measurement switch 8, detection can be positively carried out with improved reliability. Yet further, since loading completion can also be detected by operating the IG key switch 10, detection can be carried out in a simple manner. Yet further, since the latest point of time at which the vehicle speed is changed to zero is detected as the time of immediate before loading by detection information of the vehicle speed sensor, detection of immediate before loading can be carried out in a simple manner. Yet further, since the display value is held at zero when operation of the reset switch 11 is detected, the display value can be positively reset to zero when the vehicle is empty.

The above embodiment utilizes the magnetostriction sensor as load detection means, however, alternatively, a sensor other than a magnetostriction sensor that can detect load may be used, such as load detection means using a pressure sensor for detecting an internal pressure of an air spring of an air suspension. Besides the magnetostriction sensor, sensors which vary the output according to changes in temperature of the environment where the load measuring sensor is located can be applied to the present invention.

Further, the above embodiment displays the load weight measurement result to the driver, however, it is needless to say that the output (measurement result of load weight) of the load measuring apparatus of the present invention can also be utilized in a power steering apparatus, an automatic transmission, a braking apparatus, and the like.

Since the load measuring apparatus for a vehicle according to the present invention holds the output according to the load calculated at the time loading completion is detected, the load weight output from the control means will never change even if the output value of the detection means is changed due to temperature changes. Further, since, at reloading, the held load weight calculation value is corrected according to the calculation value corresponding to the difference between the output value of the detection means immediately before loading and the output value thereafter of the detection means, measurement of load weight can be carried out with effects of temperature changes eliminated, thereby improving the accuracy of measurement at reloading.

I claim:
1. A load measuring apparatus for a vehicle, comprising:
 load detection means for generating an output according to a weight of a load carried by the vehicle;
 control means for calculating and outputting a weight value of the load carried by the vehicle according to the output of the load detection means;
 loading completion detection means for detecting completion of a first loading of the load onto the vehicle;
 pre-loading detection means for detecting a condition immediately before a second loading of the load loaded onto the vehicle subsequent to said first loading; and
 a manual reset switch, wherein when operation of said manual reset switch is detected, the calculated weight value is updated to zero and held at that value, and the held calculated value is corrected according to a difference between the output of said load detection means at the time said reset switch is operated and the output thereafter of said load detection means to calculate the weight value,
 wherein said control means holds the calculated weight value at the time when completion of said first loading is detected by said loading completion detection means and continues to output the held calculated weight value, and when the condition immediately before said second loading is detected by said pre-loading detection means subsequent to said first loading, said control means updates the held calculated weight value according to a difference between the output of said load detection means at the time the condition immediately before loading is detected and the output thereafter of said load detection means.

2. The load measuring apparatus for a vehicle as claimed in claim 1, wherein said loading completion detection means detects starting of the vehicle.

3. The load measuring apparatus for a vehicle as claimed in claim 1, wherein said pre-loading detection means detects a standstill condition of the vehicle.

4. The load measuring apparatus for a vehicle as claimed in claim 3, wherein said pre-loading detection means detects that the vehicle is in the standstill condition after a lapse of a predetermined time from stopping of the vehicle.

5. The load measuring apparatus for a vehicle as claimed in claim 1, wherein said loading completion detection means is an ignition key switch.

6. The load measuring apparatus for a vehicle as claimed in claim 1, wherein at least one of said loading completion detection means and said pre-loading detection means is a manual switch.

7. The load measuring apparatus for a vehicle as claimed in claim 1, wherein at least one of said loading completion detection means and said pre-loading detection means is a manual switch.

8. The load measuring apparatus for a vehicle as claimed in claim 1, wherein said load detection means is a magnetostriction sensor.

9. The load measuring apparatus for a vehicle as claimed in claim 1, wherein said load detection means is attached to a shackle pin at a front wheel side of the vehicle.

10. The load measuring apparatus for a vehicle as claimed in claim 1, wherein said load detection means is attached to a trunnion shaft at a rear wheel side of the vehicle.

11. A method of measuring a load carried by a vehicle, comprising:

measuring a first weight indicative of a weight of a load carried by the vehicle;

detecting completion of loading of the load on the vehicle;

memorizing and maintaining the measured weight at the time when completion of the loading is detected;

detecting reloading of a load to be carried by the vehicle;

measuring a second weight indicative of a weight of a load carried by the vehicle immediately before detection of the reloading;

detecting completion of the reloading of the load on the vehicle;

measuring a third weight indicative of a weight of a load carried by the vehicle after the reloading; and calculating an actual weight being carried by the vehicle based on the measured first, second, and third weight.

12. The method of claim 11, wherein said actual weight is calculated based on a difference between said second and third weight, and a sum of the difference and the first weight.

* * * * *